(12) United States Patent
Hou et al.

(10) Patent No.: US 12,311,798 B2
(45) Date of Patent: May 27, 2025

(54) ELECTRIC VEHICLE CHARGING MANAGEMENT METHODS AND SYSTEMS WITH FLEXIBLE ADJUSTMENT OF CHARGING SCHEDULE

(71) Applicant: Noodoe Group Inc., Wilmington, DE (US)

(72) Inventors: Yi-An Hou, Taipei (TW); Ming-San Huang, Taipei (TW); En-Yu Shih, Taipei (TW); Yu-Ting Liou, Taipei (TW); Chun-Hung Kung, Taipei (TW)

(73) Assignee: NOODOE GROUP INC., Wilmington, DE (US)

( * ) Notice: Subject to any disclaimer, the term of this patent is extended or adjusted under 35 U.S.C. 154(b) by 766 days.

(21) Appl. No.: 17/678,110

(22) Filed: Feb. 23, 2022

(65) Prior Publication Data

US 2022/0410756 A1    Dec. 29, 2022

(30) Foreign Application Priority Data

Jun. 28, 2021    (TW) .................................. 110123512

(51) Int. Cl.
| | |
|---|---|
| *B60L 53/67* | (2019.01) |
| *B60L 53/30* | (2019.01) |
| *B60L 53/63* | (2019.01) |
| *B60L 53/64* | (2019.01) |
| *B60L 53/68* | (2019.01) |

(52) U.S. Cl.
CPC ............ *B60L 53/67* (2019.02); *B60L 53/305* (2019.02); *B60L 53/63* (2019.02); *B60L 53/64* (2019.02); *B60L 53/68* (2019.02)

(58) Field of Classification Search
CPC ........ B60L 53/67; B60L 53/305; B60L 53/63; B60L 53/64; B60L 53/68; B60L 2240/80; Y02T 10/70; Y02T 10/7072; Y02T 90/12; Y02T 90/167
See application file for complete search history.

(56) References Cited

U.S. PATENT DOCUMENTS

| | | | |
|---|---|---|---|
| 2012/0235646 A1* | 9/2012 | Lo .......................... | H02J 7/0013 320/137 |
| 2016/0185246 A1* | 6/2016 | Paul ........................ | B60L 53/65 320/106 |
| 2021/0178925 A1* | 6/2021 | Metzger .................. | B60L 53/63 |
| 2023/0211696 A1* | 7/2023 | Wang ...................... | B60L 53/67 320/109 |

\* cited by examiner

*Primary Examiner* — Jack Chiang
*Assistant Examiner* — Brandon Bowers
(74) *Attorney, Agent, or Firm* — McClure, Qualey & Rodack, LLP

(57) ABSTRACT

Electric vehicle charging management methods and systems with flexible adjustment of charging schedule are provided. A server executes an energy management scheme to determine a target power parameter value for a charging operation of each electric vehicle charging station, and perform the charging operations accordingly for respective electric vehicles. A specific charging demand of a specific electric vehicle charging station or a specific electric vehicle is received, wherein the specific charging demand includes at least a demand time. In response to the specific charging demand, the target power parameter value corresponding to the charging operation of the specific electric vehicle charging station is adjusted, wherein the power of the specific electric vehicle at the time of demand will be higher than a predetermined power value.

9 Claims, 5 Drawing Sheets

ELECTRIC VEHICLE CHARGING MANAGEMENT METHODS AND SYSTEMS WITH FLEXIBLE ADJUSTMENT OF CHARGING SCHEDULE

BACKGROUND OF THE INVENTION

Field of the Invention

The disclosure relates generally to charging management methods and systems for electric vehicles, and, more particularly to charging management methods and systems for electric vehicles that can provide flexible adjustment of charging schedule according to specific demands.

Description of the Related Art

Recently, with the rising awareness of environmental protection and electric vehicle technology advances, the development of electric vehicles powered by electrical energy to replace traditional vehicles powered by fossil fuels has gradually become an important goal in the automotive field, thus making electric vehicles become more and more popular. In order to increase the range and willingness to use electric vehicles, many countries or cities have begun to set up charging stations in public places to provide electricity to electric vehicles, and have also begun to plan the deployment of a large number of charging stations in urban areas or scenic areas, so as to make the charging of electric vehicles more convenient.

Generally, the power equipment in the most field has already been constructed. To update the power equipment, such as the capacity of the electric panel, it is expensive and the construction time is long. Often, the number of charging stations that can be installed in a single charging field is limited by the existing maximum load capacity of the field. Therefore, in the case of limited charging stations, the drivers of electric vehicles may have to wait since the charging station may be in use, or need to find other nearby charging stations for charging operations, which causes inconvenience in use, and drives the willingness to adopt electric vehicles.

Therefore, under the premise of not updating the power equipment, some charging fields can introduce load adjustment operations to increase the number of charging stations that can be installed in the field. In the load adjustment operation, by reducing the power output of individual charging stations, more electric vehicles can be charged in the charging field at the same time. On the other hand, since the power provided by the power companies and the power grids is limited, the issue of the power required for electric vehicle charging operations being an impact of the power grids has also become critical for the industry. For example, in some industrial applications, a scheduled charging mechanism can be used to utilize the off-peak period of power consumption for charging, so as to achieve the purpose of reducing grid impact. However, there will be various needs for different industries, and there will be temporary and special demands at the same time. Therefore, how to maintain flexibility in the charging management of electric vehicles will become an important key to the development of electric vehicles.

BRIEF SUMMARY OF THE INVENTION

In an embodiment of an electric vehicle charging management method with flexible adjustment of charging schedule, which is applicable to a charging field including a plurality of electric vehicle charging stations, and the electric vehicle charging stations are connected to a server through a network. the server executes an energy management scheme, which records a power distribution logic for controlling a charging operation for each of the electric vehicle charging stations, thus to determine a corresponding target power parameter value for the charging operation of each electric vehicle charging station, and perform the charging operations accordingly for respective electric vehicles through the respective electric vehicle charging stations. Then, a specific charging demand of a specific electric vehicle charging station or a specific electric vehicle is received, wherein the specific charging demand comprises at least a demand time. In response to the specific charging demand, the target power parameter value corresponding to the charging operation of the specific electric vehicle charging station is adjusted, wherein the power of the specific electric vehicle at the time of demand will be higher than a predetermined power value.

An embodiment of an electric vehicle charging management system with flexible adjustment of charging schedule for use in a charging field comprises a plurality of electric vehicle charging stations, and a server. Each electric vehicle charging station has a network connection capability, and connects to the server through a network. The server comprises at least one energy management scheme, which records a power distribution logic for controlling a charging operation for each of the electric vehicle charging stations. The server executes the energy management scheme, thus to determine a corresponding target power parameter value for the charging operation of each electric vehicle charging station, and perform the charging operations accordingly for respective electric vehicles through the respective electric vehicle charging stations. When a specific charging demand of a specific electric vehicle charging station or a specific electric vehicle is received, in which the specific charging demand comprises at least a demand time. In response to the specific charging demand, the server adjusts the target power parameter value corresponding to the charging operation of the specific electric vehicle charging station, wherein the power of the specific electric vehicle at the time of demand will be higher than a predetermined power value.

In some embodiments, the server further adjusts the target power parameter value corresponding to the charging operation of each of the electric vehicle charging stations when the specific charging demand is received, wherein the sum of the adjusted target power parameter of each of the electric vehicle charging stations is not higher than a power limit corresponding to the charging field.

In some embodiments, the server further executes a charging scheduling operation for each of the electric vehicle charging stations according to a time-of-use (TOU) rate, so as to determine a specific time point for each of the electric vehicle charging stations to perform the charging operation, and adjusts the specific time point of the charging operation corresponding to the specific electric vehicle charging station when the specific charging demand is received.

In some embodiments, the server further calculates an adjustment cost corresponding to the specific charging demand according to the TOU rate and the specific time point of the charging operation corresponding to the specific electric vehicle charging station after adjustment.

Electric vehicle charging management methods with flexible adjustment of charging schedule may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
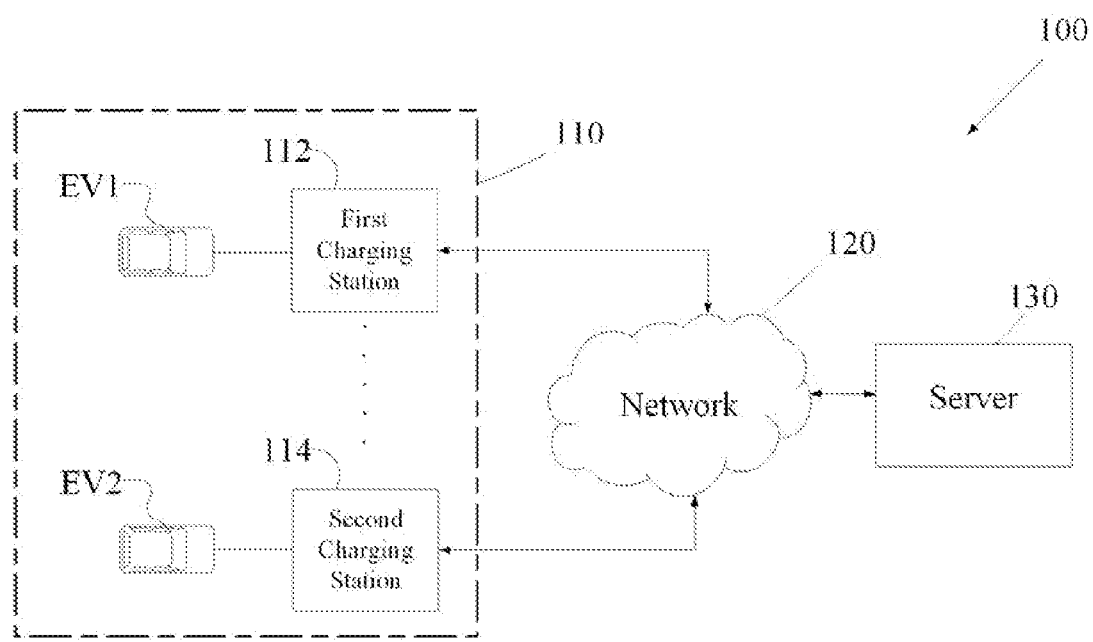
FIG. 1 is a schematic diagram illustrating an embodiment of an embodiment of an electric vehicle charging management system with flexible adjustment of charging schedule of the invention.

FIG. 1 is a schematic diagram illustrating an embodiment of an electric vehicle charging management system with flexible adjustment of charging schedule of the invention. The electric vehicle charging management system with flexible adjustment of charging schedule 100 can be used in a charging filed 110 with a plurality of electric vehicle charging stations. It is noted that, the charging filed 110 has a power limitation. As shown in FIG. 1, the electric vehicle charging management system with flexible adjustment of charging schedule 100 comprises a plurality of electric vehicle charging stations, such as a first charging station 112 and a second charging station 114, and a server 130 respectively connected with the first charging station 112 and the second charging station 114 via a network 120. The respective charging stations can provide electric vehicles (EV1, EV2) for charging operations. In some embodiments, the network 120 may be a wired network, a telecommunication network, and a wireless network, such as a Wi-Fi network. The server 130 can respectively receive various data from the first charging station 112 and the second charging station 114, and transmit related signals to the first charging station 112 and the second charging station 114. The first charging station 112 and the second charging station 114 can perform related operations according to the signals received from the server 130. For example, when the electric vehicle EV1 is coupled to the first charging station 112 through a charging gun of the first charging station 112 for a charging operation, the first charging station 112 can continuously transmit charging information corresponding the charging operation of the electric vehicle EV1 via the network 120, and the server 130 can receive the charging information of the corresponding charging operation from the first charging station 112 via the network 120. Similarly, when the electric vehicle EV2 is coupled to the second charging station 114 through a charging gun of the second charging station 114 to perform a charging operation, the second charging station 114 can continuously transmit the charging information corresponding the charging operation of the electric vehicle EV2 via the network 120, and the server 130 can receive the charging information of the corresponding charging operation from the second charging station 114 via the network 120. In some embodiments, the charging information may include at least a charging start time, a charging period, an output power, and/or related information indicating whether a load adjustment operation is being performed. The server 130 can know the usage status of the corresponding electric vehicle charging station according to the charging information.

It is noted that the user can connect the electric vehicle EV1 and the first charging station 112 to each other, such as inserting a charging gun into the charging port of the electric vehicle to send a charging request corresponding to the first charging station 112 to use the first charging station 112. The first charging station 112 performs a charging operation for the electric vehicle EV1. Similarly, the user can connect the electric vehicle EV2 and the second charging station 114 to each other, such as inserting a charging gun into the charging port of the electric vehicle to send a charging request corresponding to the second charging station 114 to use the second charging station 114. It is understood that, in some embodiments, the server 130 may directly or indirectly receive a charging request from a mobile device (not shown in FIG. 1) of the owner of the electric vehicle EV1, and generate a charging authorization command based on the charging request and transmit it to the first charging station 112 via the network 120, so that the first charging station 112 outputs power to the electric vehicle EV1, such as an electric scooter or an electric car, which is electrically connected to it, or prohibits the first charging station 112 from outputting power to the electric vehicle EV1. It is reminded that, in some embodiments, the charging request may be accompanied by an identity authentication and/or a payment mechanism, and the charging authorization command will only be generated after the identity authentication and/or payment mechanism is completed. In some embodiments, the user of the electric vehicle EV1 can use his/her mobile device to download and install an application to generate a charging request through the user interface of the application. In some embodiments, the user can scan a Quick Response Code (QR code) on the first charging station 112 through the scanning function of the application to generate the above-mentioned charging request, thereby starting a charging operation. In some embodiments, the user can select a specific charging station through the application and execute an activation function to generate the above-mentioned charging request, thereby starting a charging operation. It is understood that, in some embodiments, the owner of the electric vehicle EV1 can use an RFID card to approach an induction area (not shown in FIG. 1) on the first charging station 112 to generate a corresponding charging request, and sent it to the server 130 via the network 120. It is reminded that, in some embodiments, each user can have an RFID card.

It is noted that, the device corresponding to the owner of the electric vehicle can be any electronic device capable of Internet access, such as mobile devices, such as mobile phones, smart phones, personal digital assistants, global positioning systems, and notebook computers. In some embodiments, the mobile device can receive status information and notifications of the corresponding charging operation from the cloud management server 130 via the network 120. In some embodiments, the status information and notification may include notifying that the electric vehicle has stopped charging, notifying that the vehicle needed to be moved, and/or notifying that the charging gun of the electric vehicle charging device has been disconnected from the electric vehicle, and so on.

As mentioned above, the charging field 110 has a power limit. The server 130 can perform a load adjustment operation for the electric vehicle charging stations in the charging field 110 according to at least one energy management scheme. Specifically, the server 130 can generate an instruction and send the instruction to the respective charging station (112, 114) via the network 120 to control the charging station to output power for charging with a specified power parameter, such as a specified amperage, during a specific period of time to the electric vehicle connected to the station, or to prohibit the charging station from outputting power to the electric vehicle. It is noted that, in some embodiments, when the server 130 receives the charging requests from the charging stations, a charging scheduling operation may be performed for the charging requests. In some embodiments, the charging scheduling operation may be performed in conjunction with a time-of use (TOU) rate. For example, when the electric vehicle and the charging station are connected to each other, for example, after the charging gun is inserted into the charging port of the electric vehicle, the corresponding charging operation will not be executed immediately. The server will schedule the charging operation for the respective electric vehicles according to the TOU rate, the power limit of the charging field, and the electric vehicles that needs to be charged, determine an appropriate charging time point for each charging operation, and accordingly execute the respective charging operations with the lowest electricity cost.

Figure 2:
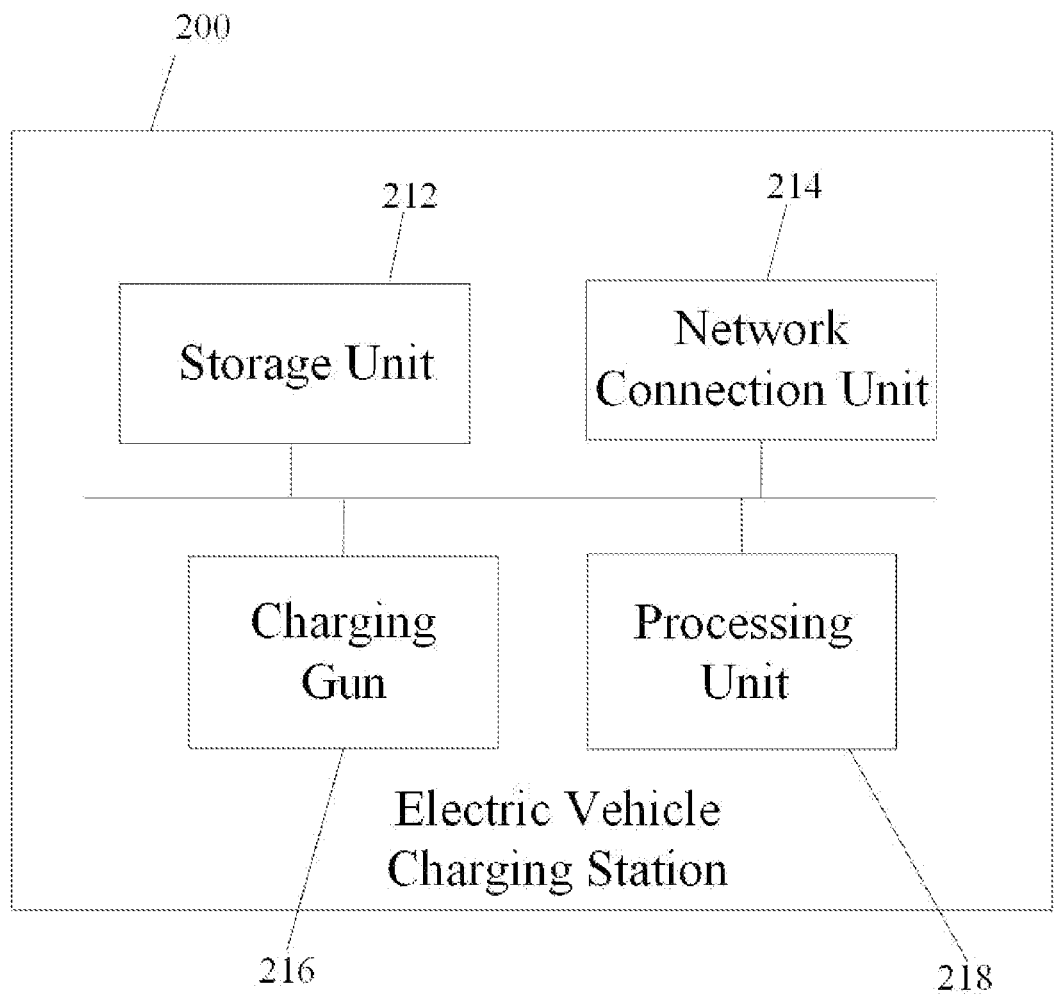
FIG. 2 is a schematic diagram illustrating an embodiment of an electric vehicle charging station of the invention.

FIG. 2 is a schematic diagram illustrating an embodiment of an electric vehicle charging station of the invention. The electric vehicle charging station 200 shown in FIG. 2 can be applied to the first charging station 112 and the second charging station 114 in FIG. 1, which has processing and computing capabilities to perform charging management operations for the electric vehicle charging station. The electric vehicle charging station 200 has a network connection capability to receive, download or update various parameters and information required for charging management calculations.

The electric vehicle charging station 200 at least comprises a storage unit 212, a network connection unit 214, a charging gun 216, and a processing unit 218. The storage unit 212 may be a memory or a database for storing and recording related data. The data may be related information such as charging station ID of the electric vehicle charging station and charging requests. It should be noted that the aforementioned information is only example, and the invention is not limited thereto. The network connection unit 214 can use a network, such as a wired network, a telecommunications network, and a wireless network, such as a Wi-Fi network, to receive, download, or update various parameters and information required for charging management operations. The charging gun 216 may include one or more charging connectors that meet the same charging interface specification or meet different charging interface specifications, and are electrically connected to the corresponding electric vehicle. The processing unit 218 can control the operations of related software and hardware in the electric vehicle charging station 200, and cooperate with the server 130 to execute the methods of the invention. Related details will be described later. It is noted that, in some embodiments, the processing unit 218 may be a general-purpose controller, a Micro-Control Unit, MCU, or a Digital Signal Processor, DSP, etc., to provide functions of data analysis, processing and calculation, but the present invention is not limited to this. In one embodiment, the processing unit 218 may use the network connection unit 214 to transmit the power state of the corresponding electric vehicle through a network for a cloud management server, such as the cloud server 130, for subsequent charging management. In another embodiment, the processing unit 218 can obtain the power parameter of a charging operation from the server 130, determine the output power according to the power parameter received from the server 130, and output the power to at least one electric vehicle through the charging gun 216 to perform the charging operation. It is understood that, in some embodiments, the electric vehicle charging station 200 may comprise a card reading unit, such as an RFID reading unit for sensing information of a physical card, such as RFID card. The information sensed from the RFID card may be a card identification code of the physical card.

It is understood that, the electric vehicle charging station 200 has an upper power limit value and a lower power limit value. Specifically, the electric vehicle charging station 200 can use the upper power limit value as the power parameter at the highest to output power to the electric vehicle during a charging operation. On the other hand, the electric vehicle charging station 200 needs to use the lower power limit value as the power parameter at least to output power to the electric vehicle during a charging operation. It must be noted that, charging stations of different brands and models may have different upper power limit values for output power and lower power limit values for output power. The present invention is not limited to any value, and the value may be different for different charging stations.

Figure 3:
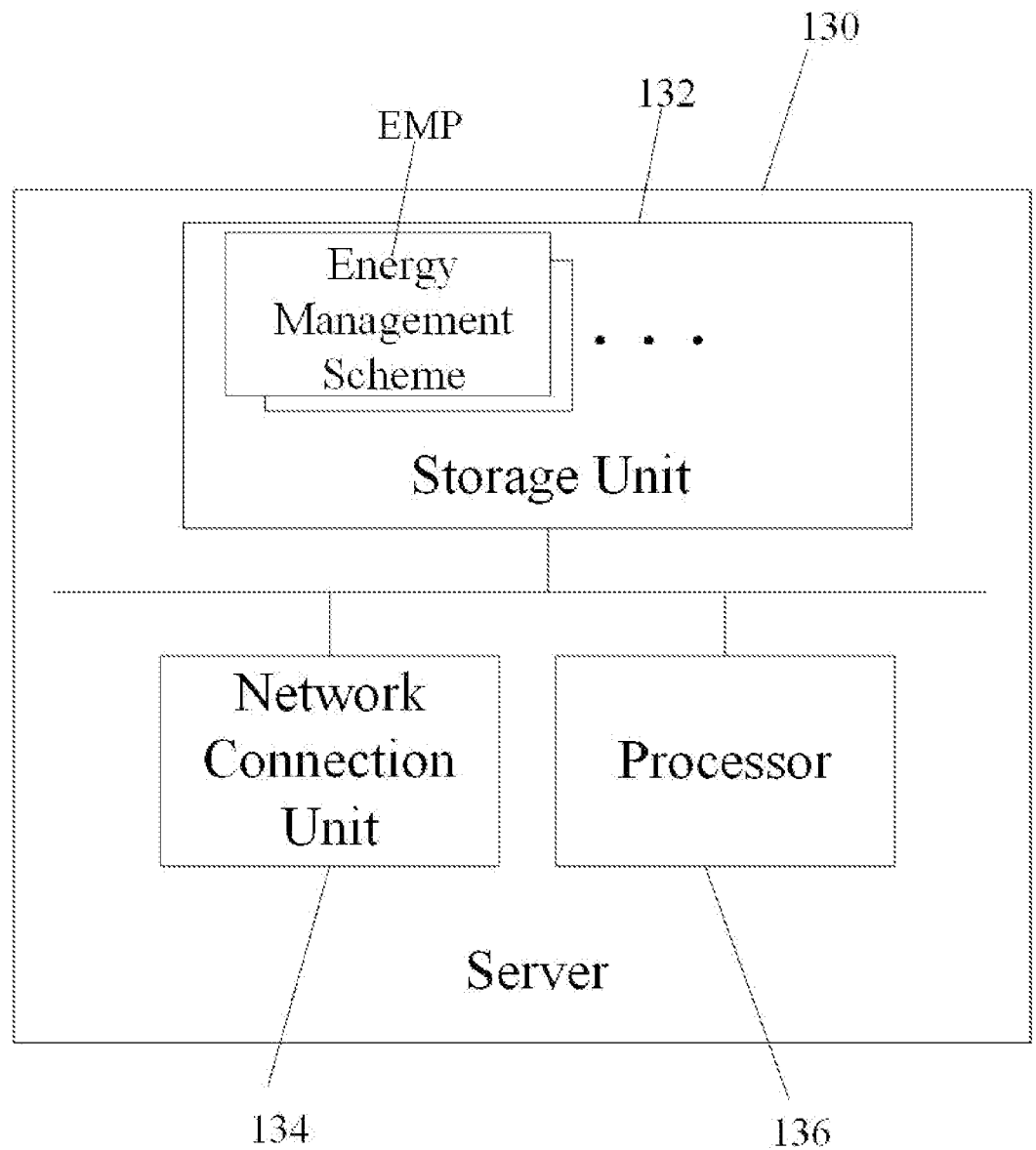
FIG. 3 is a schematic diagram illustrating an embodiment of a server of the invention.

FIG. 3 is a schematic diagram illustrating an embodiment of a server of the invention. As shown in FIG. 3, the server 130 of the invention can be any processor-based electronic device, which comprises at least a storage unit 132, a network connection unit 134, and a processor 136. It is noted that, the server 130 can receive various data corresponding to a plurality of electric vehicle charging stations in a charging field. The server 130 can directly or indirectly receive a charging request from a mobile device, and after completing actions such as identity confirmation in response to the charging request, generate a charging authorization command and transmit it to the corresponding electric vehicle charging station via the network. In response to the charging authorization command, the electric vehicle charging station is allowed to output power to an electric vehicle (for example, an electric motorcycle or an electric vehicle, etc.) that is electrically connected to it, or prohibit the electric vehicle charging station from outputting power to the electric vehicle.

The storage unit 132 may be a memory, which can store and record related data, such as various data of the electric vehicle charging stations. It is noted that, the storage unit 132 may include at least one energy management scheme EMP. The energy management scheme EMP records a distribution logic for controlling a charging operation of each electric vehicle charging station. It is reminded that, the power distribution logic is configured to determine the execution order of the individual charging requests (charging operations) of the corresponding charging stations, and the corresponding target power parameter value during the respective charging operations under the power limitation of the charging field. It should be noted that, in some embodiments, the storage unit 132 may include a time setting table for setting at least one peak period and one off-peak period, and a corresponding TOU rate. Through the network connection unit 134, the server 130 can be coupled to and communicates with the electric vehicle charging stations (112, 114) via the network 120, such as a wired network, a telecommunications network, and a wireless network, such as a Wi-Fi network, and transmits related data/signals/commands to different electric vehicle charging stations via the network 120 to control whether the electric vehicle charging stations output power, and specify power parameters for outputting power to electric vehicles. The processor 136 can control the operations of related software and hardware in the server 130, and execute the methods of the invention. The relevant details will be described later. It is reminded that, when the server has multiple energy management schemes EMP, the processor 136 can select one of the energy management schemes EMP, and execute a load adjustment operation for the charging field according to the selected energy management scheme EMP. It should be noted that, in some embodiments, the processor 136 may be a general-purpose controller, a microcontroller, or a digital signal controller, etc., for providing data analysis, processing and computing functions, but the present invention is not limited to this. It should be reminded that, as mentioned above, the server may execute a charging scheduling operation for the charging requests of the electric vehicle charging stations. In some embodiments, the charging scheduling operation can be performed with the TOU rate, so that all charging operations can be performed with the lowest electricity cost.

Figure 4:
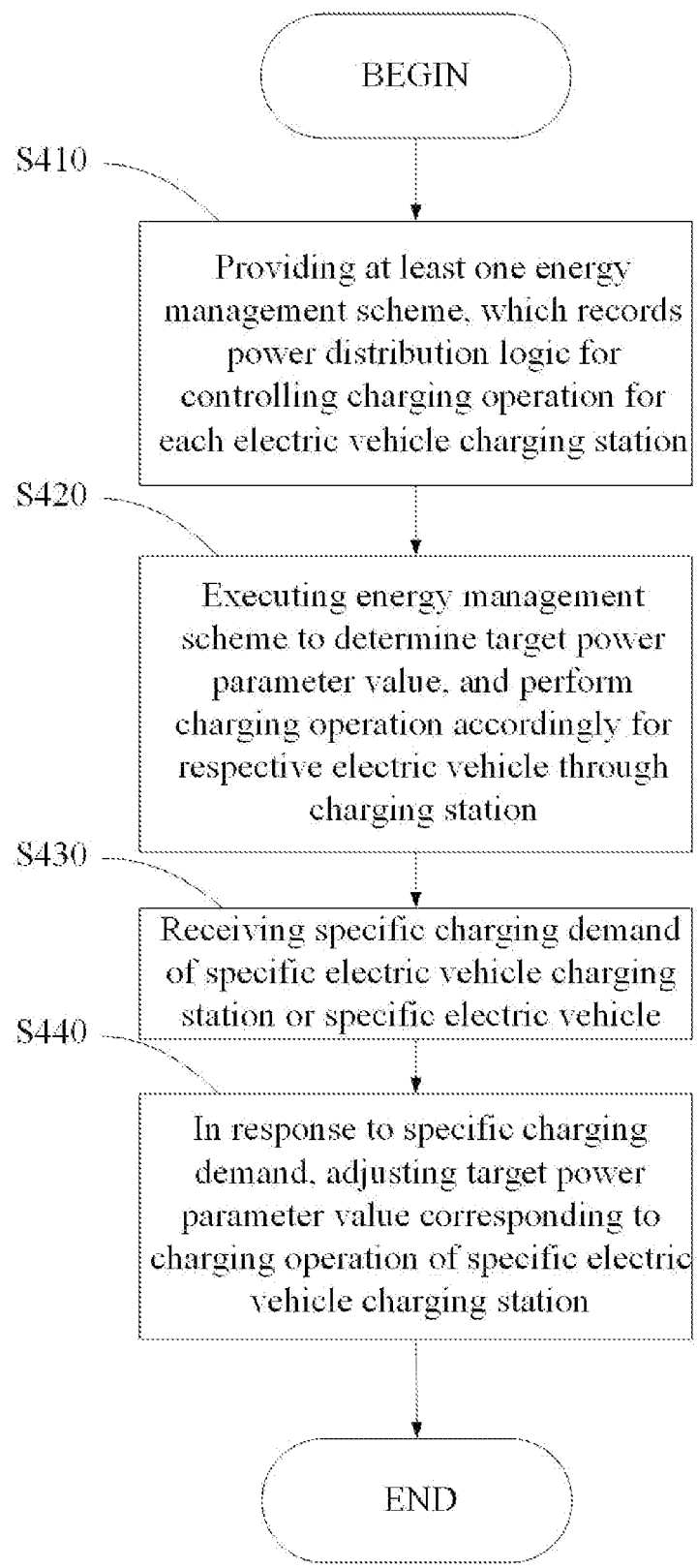
FIG. 4 is a flowchart of an embodiment of an electric vehicle charging management method with flexible adjustment of charging schedule of the invention.

FIG. 4 is a flowchart of an embodiment of an electric vehicle charging management method with flexible adjustment of charging schedule of the invention. The electric vehicle charging management method with flexible adjustment of charging schedule of the invention is applicable to a charging field comprising a plurality of charging stations, and the charging field has a power limit. The respective electric vehicle charging station in the charging field can be electrically coupled with a remote server via a network. In one example, the charging field may belong to a logistics operator for charging the electric vehicles it distributes goods.

In step S410, at least one energy management scheme is provided on the server. As mentioned, the energy management scheme may record a distribution logic to control a charging operation of each electric vehicle charging station. It is reminded that, the power distribution logic is configured to determine the execution order of the individual charging requests (charging operations) of the corresponding charging stations, and the corresponding target power parameter value during the charging operation under the power limitation of the charging field. In step S420, the server executes the energy management scheme to determine a target power parameter value for the charging operation of each electric vehicle charging station, and accordingly perform the charging operations for the coupled electric vehicles via the respective electric vehicle charging stations. For example, when the total number of the electric vehicle charging stations that need to perform charging operations multiplied by the power upper limit value of individual electric vehicle charging stations is greater than the power limit of the charging field, the power (target power parameter value) of each electric vehicle charging station is will be scaled down, so that the total output power does not exceed the power limit of the charging field. Then, in step S430, a specific charging demand of a specific charging station or a specific electric vehicle coupled to the specific charging station is received. Note that, in some embodiments, the specific charging demand comprises at least a demand time that the specific electric vehicle is required to be use. It should be noted that, in some embodiments, the server may provide an interface for receiving the specific charging demand. The interface can specify a specific charging station, a specific electric vehicle connected to the specific charging station, and/or a corresponding demand time. In response to the specific charging demand, in step S440, the target power parameter value corresponding to the charging operation of the specific charging station is adjusted according to the demand time. It is noted that, after the specific charging station performed the charging operation according to the adjusted target electric power parameter value, the power input to the specific electric vehicle will be higher than a predetermined power value at the demand time. It must be noted that, the predetermined power value can be set according to different industries and applications. In some embodiments, the predetermined power value may be 80% of the battery capacity of the electric vehicle. In some embodiments, the setting of the predetermined power value can also be adjusted. It should be noted that, in some embodiments, if the adjusted target power parameter corresponding to the charging operation of the specific charging station causes the total amount of power required by all charging operations to exceed the power limit of the charging field, the target power parameter values of other charging operations will also be adjusted, such as reduced, to ensure that the total power required for charging does not exceed the power limit of the charging field.

Figure 5:
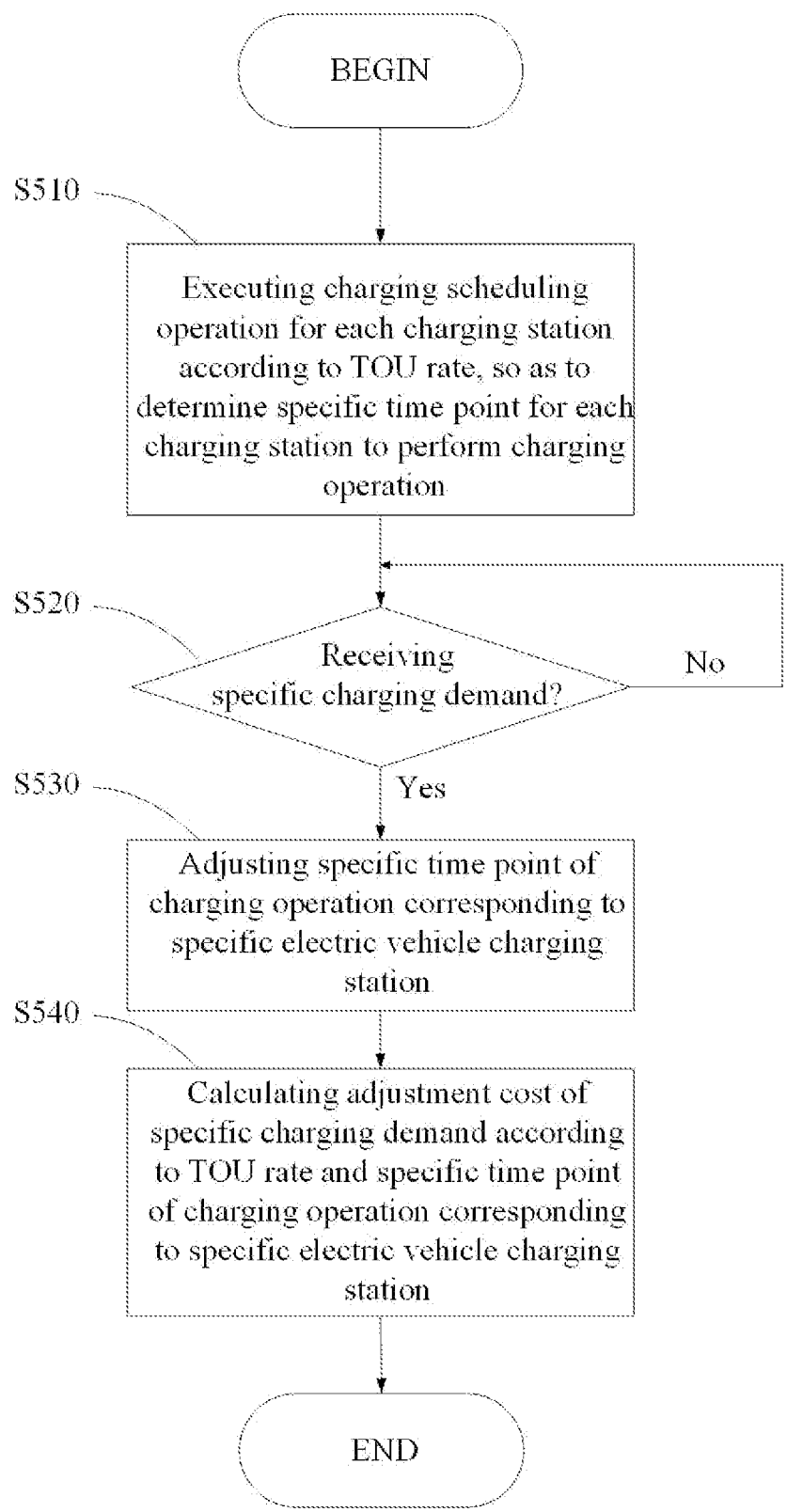
FIG. 5 is a flowchart of another embodiment of an electric vehicle charging management method with flexible adjustment of charging schedule of the invention.

FIG. 5 is a flowchart of another embodiment of an electric vehicle charging management method with flexible adjustment of charging schedule of the invention. The electric vehicle charging management method with flexible adjustment of charging schedule of the invention is applicable to a charging field comprising a plurality of charging stations, and the charging field has a power limit. The respective electric vehicle charging station in the charging field can be electrically coupled with a remote server via a network. It is reminded that, in this embodiment, the server may execute a charging scheduling operation for the charging operation of the individual electric vehicle charging station according to a TOU rate. Similarly, in one example, the charging field may belong to a logistics operator for charging the electric vehicles it distributes goods.

First, in step S510, the server executes a charging scheduling operation for each electric vehicle charging station according to a TOU rate to determine a specific time point for each electric vehicle charging station to perform the charging operation. It is understood that, as mentioned above, the charging scheduling operation can be performed with the TOU rate. The server can schedule the charging according to the TOU rate, the power limit of the charging field, and the electric vehicle that needs to be charged, determine the appropriate charging time point, and accordingly execute all the charging operations with the lowest electricity cost. In step S520, it is determined whether a specific charging demand is received. When the specific charging demand is not received (No in step S520), the determination in step S520 is continued. When the specific charging demand is received (Yes in step S520), in step S530, the specific time point of the charging operation corresponding to the specific charging station is adjusted. It should be noted that, in some embodiments, the target power parameter value corresponding to the charging operation of the specific charging station can also be adjusted according to the demand time after receiving the specific charging demand. It is noted that, after the specific charging station performed the charging operation according to the adjusted target power parameter value, the power of the specific electric vehicle will be higher than a predetermined power value at the demand time, as described in the embodiment of FIG. 4. Similarly, the predetermined power value can be set according to different industries and applications. In some embodiments, the predetermined power value may be 80% of the battery capacity of the electric vehicle. Similarly, in some embodiments, if the adjusted target power parameter corresponding to the charging operation of a specific charging station cause the total amount of power required by all charging operations to exceed the power limit of the charging field, the respective target power parameter value of other charging operations will also be adjusted, such as reduced, to ensure that the total power required for charging does not exceed the power limit of the charging field. Then, in step S540, an adjustment cost corresponding to the specific charging demand is calculated according to the adjusted specific time point of the charging operation of the specific charging station and the TOU rate. Note that, when the target power parameter value of the charging operation of the respective electric vehicle charging station is adjusted, the adjustment cost will also be calculated according to the adjusted charging time point and the adjusted target power parameter of the charging operation of the individual electric vehicle charging station, and the TOU rate.

It must be noted that, in some embodiments, the adjustment cost calculated by the server can be provided to a charging field operator, such as a logistics operator, to evaluate the impact of the specific charging demand, so as to make subsequent adjustments in business execution decision making. Therefore, through the electric vehicle charging management method and system with flexible charging schedule adjustment in this case, it is possible to provide flexible charging schedule adjustment for electric vehicle charging management operations according to specific demands, and further increase the flexibility of the load adjustment and/or schedule charging operations in individual charging fields.

Electric vehicle charging management methods with flexible adjustment of charging schedule, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for executing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for executing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. An electric vehicle charging management method with flexible adjustment of charging schedule, which is applicable to a charging field including a plurality of electric vehicle charging stations, and the electric vehicle charging stations are connected to a server through a network, comprising:
   providing at least one energy management scheme, which records a power distribution logic for controlling a charging operation for each of the electric vehicle charging stations;
   executing the energy management scheme by the server, thus to determine a corresponding target power parameter value for the charging operation of each electric vehicle charging station, and perform the charging operations accordingly for respective electric vehicles through the respective electric vehicle charging stations;
   receiving a specific charging demand of a specific electric vehicle charging station or a specific electric vehicle, wherein the specific charging demand comprises at least a demand time; and
   in response to the specific charging demand, adjusting the target power parameter value corresponding to the charging operation of the specific electric vehicle charging station by the server,
   wherein the power of the specific electric vehicle at the time of demand will be higher than a predetermined power value.

2. The method of claim 1, further comprising a step of adjusting the target power parameter value corresponding to the charging operation of each of the electric vehicle charging stations when the specific charging demand is received, wherein the sum of the adjusted target power parameter of each of the electric vehicle charging stations is not higher than a power limit corresponding to the charging field.

3. The method of claim 1, further comprising:
   executing a charging scheduling operation for each of the electric vehicle charging stations according to a time-of-use (TOU) rate, so as to determine a specific time point for each of the electric vehicle charging stations to perform the charging operation; and
   adjusting the specific time point of the charging operation corresponding to the specific electric vehicle charging station when the specific charging demand is received.

4. The method of claim 3, further comprising a step of calculating an adjustment cost corresponding to the specific charging demand according to the TOU rate and the specific time point of the charging operation corresponding to the specific electric vehicle charging station after adjustment.

5. An electric vehicle charging management system with flexible adjustment of charging schedule for use in a charging field, comprising:
   a plurality of electric vehicle charging stations, each having a network connecting capability; and
   a server having at least one energy management scheme, which records a power distribution logic for controlling a charging operation for each of the electric vehicle charging stations, executing the energy management scheme by the server, thus to determine a corresponding target power parameter value for the charging operation of each electric vehicle charging station, and perform the charging operations accordingly for respective electric vehicles through the respective electric vehicle charging stations, receiving a specific charging demand of a specific electric vehicle charging station or a specific electric vehicle, wherein the specific charging demand comprises at least a demand time, and in response to the specific charging demand, adjusting the target power parameter value corresponding to the charging operation of the specific electric vehicle charging station by the server, wherein the power of the specific electric vehicle at the time of demand will be higher than a predetermined power value.

6. The system of claim 5, wherein the server further adjusts the target power parameter value corresponding to the charging operation of each of the electric vehicle charging stations when the specific charging demand is received, wherein the sum of the adjusted target power parameter of each of the electric vehicle charging stations is not higher than a power limit corresponding to the charging field.

7. The system of claim 5, wherein the server further executes a charging scheduling operation for each of the electric vehicle charging stations according to a time-of-use (TOU) rate, so as to determine a specific time point for each of the electric vehicle charging stations to perform the charging operation, and adjusts the specific time point of the charging operation corresponding to the specific electric vehicle charging station when the specific charging demand is received.

8. The system of claim 7, wherein the server further calculates an adjustment cost corresponding to the specific charging demand according to the TOU rate and the specific time point of the charging operation corresponding to the specific electric vehicle charging station after adjustment.

9. A machine-readable storage medium comprising a computer program, which, when executed, causes a device to perform an electric vehicle charging management method with flexible adjustment of charging schedule, which is applicable to a charging field including a plurality of electric vehicle charging stations, and the electric vehicle charging stations are connected to a server through a network, wherein the method comprises:

executing an energy management scheme, which records a power distribution logic for controlling a charging operation for each of the electric vehicle charging stations, thus to determine a corresponding target power parameter value for the charging operation of each electric vehicle charging station, and perform the charging operations accordingly for respective electric vehicles through the respective electric vehicle charging stations;

receiving a specific charging demand of a specific electric vehicle charging station or a specific electric vehicle, wherein the specific charging demand comprises at least a demand time; and in response to the specific charging demand, adjusting the target power parameter value corresponding to the charging operation of the specific electric vehicle charging station, wherein the power of the specific electric vehicle at the time of demand will be higher than a predetermined power value.

\* \* \* \* \*